(Model.)
C. S. BAVIER.
COMPRESSION JOINT.
No. 519,805. Patented May 15, 1894.
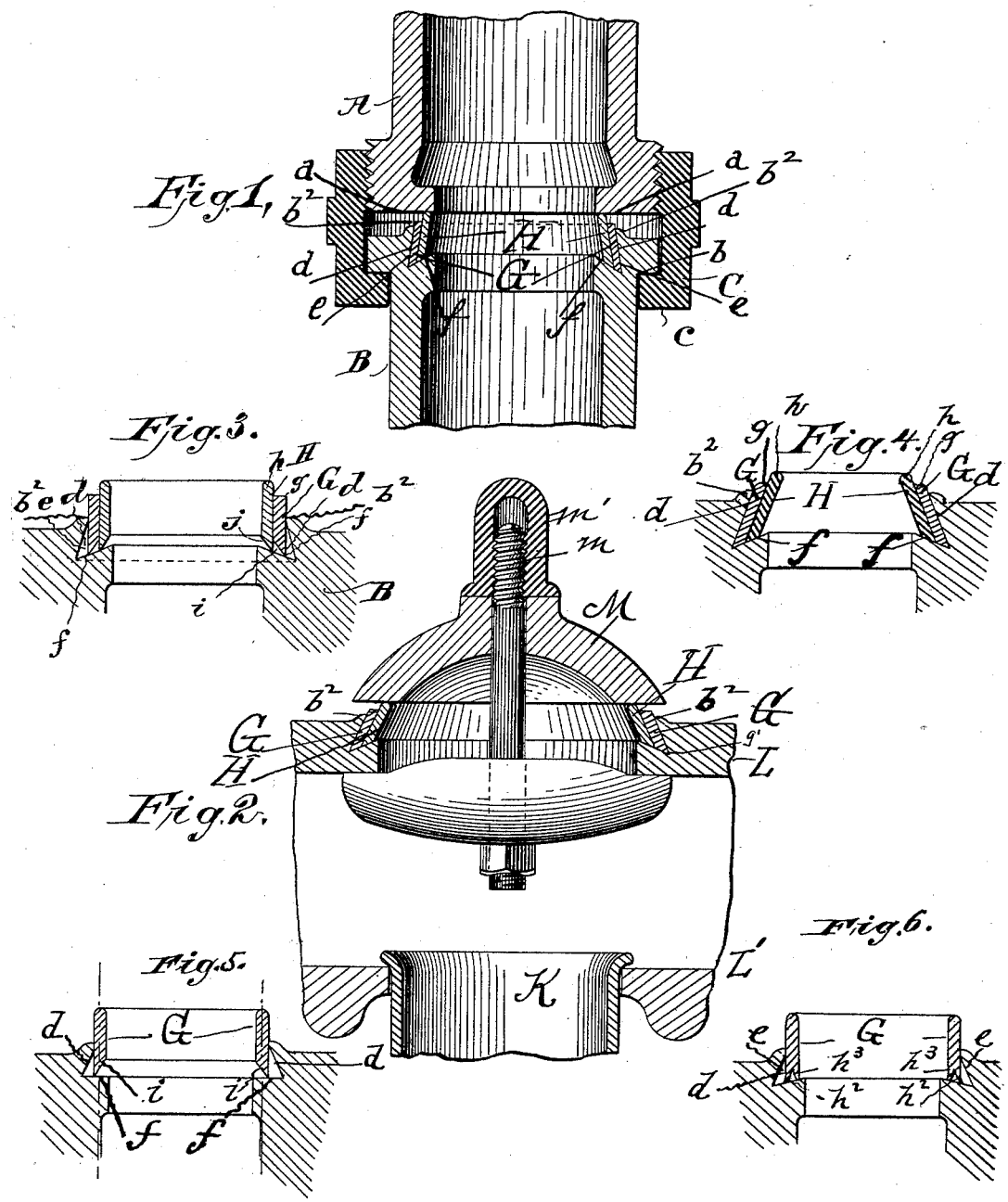
Attest:
C. M. Benjamin
Madge F. J. Taylor
Inventor:
Charles S. Bavier
G. D. Walter Brown,
his attorney

UNITED STATES PATENT OFFICE.

CHARLES S. BAVIER, OF NEW YORK, N. Y.

COMPRESSION-JOINT.

SPECIFICATION forming part of Letters Patent No. 519,805, dated May 15, 1894.

Application filed July 11, 1891. Serial No. 399,245. (Model.) Patented in England August 1, 1891, No. 13,094.

*To all whom it may concern:*

Be it known that I, CHARLES S. BAVIER, a citizen of the United States of America, residing at the city of New York, in the county of New York, State of New York, have invented certain new and useful Improvements in Compression-Joints, of which the following is a specification.

My invention relates to improvements in joints which are formed by compression of a ring between two flanges or surfaces. Such joints are used for a great variety of purposes, as between cylinders and cylinder-heads, between the two parts of pipe couplings, between man-hole plates and shells of boilers, in the end connections of water-tube boilers, between valve disks and valve seats, &c.

Particularly my invention relates to improvements in the joint shown and described in my Patent No. 452,357, dated May 19, 1891, and the object of the present invention is to provide several removable and interchangeable seats in one joint, so that as one seat wears out another will be ready, and also to so form the joint rings that they will be more readily forced home to place in their recesses.

The improvement hereinafter described and claimed has been patented to me in Great Britain by Letters Patent of that kingdom, numbered 13,094, and bearing date the 1st day of August, 1891. In my said patent I showed a joint having a single ring, which was expanded home by pressure on its face. Said ring had a plane or rounded face and a plane base. I find by experience, that in order to get sufficient compression of such ring it requires to be made quite thin, thereby becoming liable to speedier injury, and presenting a bad appearance in a joint. I have therefore devised a joint wherein a plurality of such rings is employed, so that if one ring is injured, there is another ready to form a perfect seat. I also so shape the rings that they more readily yield to pressure and more readily expand themselves home in their recesses.

Referring to the drawings which accompany the specification to aid in the description, Figure 1, is a longitudinal section of a coupling, with my ring joint. Fig. 2, is a longitudinal section of the end connection of a water tube boiler, with my ring joint. Fig. 3, is a section of the rings before they are expanded home. Fig. 4, is a view of two rings after they are expanded home. Fig. 5, is a view of a ring, in a recess which has a horizontal base, and before expansion. Fig. 6, is a view of a ring with a split claw, under surface and before expansion.

Referring to Fig. 1, A and B, are the two parts of an ordinary pipe coupling, and C, is the screw ring, with flange $c$ engaging on a flange, $b$, of part B, in the ordinary manner of such couplings. As is well understood, the two parts A and B, are made to approach each other by revolving the ring C.

The joint is made in the following manner:—The face $a$, of part A, is made a hard indexical surface, and in the part B is formed an annular recess, $d$, which has its side wall undercut as at $e$, and its base preferably inclining downwardly and outwardly from the center of the annular recess, $d$, as clearly indicated at $f$. Said inclined base $f$, is broad enough to receive and support a plurality of rings G, H, usually two in number, as in Figs. 1, 2 and 3. Said rings G, H, are each made of malleable material, as soft copper, and are readily formed by cutting cross sections from copper tubes. The diameters of the several rings G, H, are such that the one ring will just fit within the other. The upper compression surface, $g$, $h$, of each ring is either plane, or rounded, and the lower surfaces, $i, j$, are beveled downwardly and outwardly, and at a more acute angle than the inclination of the base $f$. The object of said bevel is two-fold: first, that when the rings G, H, are expanded home to place as in Figs. 1, 2, and 4, the under surfaces $i$ or $j$ of the said rings may fit flatly on the base $f$ of the recess $e$, and secondly that the lower part of the rings G, H, &c., may be weakened by being cut away to a point $g'$ so that said point $g'$ will yield readily to the pressure which is exerted on the upper surfaces of said rings and will turn outward toward the side walls $d$. Thus when pressure is exerted on the surfaces $g$, $h$, of said ring G, the lower parts of the ring will slide laterally, (or be expanded) over the inclined base, $f$, and against and under the undercut side wall $d$, thereby retaining the said ring in its place. When a plurality of rings is used, the outer ring G is first inserted loosely into the recess e, and the member A is screwed down hard on the top of said ring, thereby expanding the ring G home to place, as at Fig. 4. Then the next inner ring H, which is made a little higher than the first ring G is inserted within said first ring and expanded home in the same manner. Evidently the first ring G, will form in effect an undercut side wall, and the second ring H, will be expanded against and under the first ring, in the same manner as that first ring was expanded against the walls of the recess. If more than two rings are used, then each ring is made a little higher than the next outer ring, and each ring will be expanded home to place by pressure on its upper surface, as in the case of the first two rings. To increase the number of joint seats I also form a seat b, in the surface of the part B. Now if the innermost ring H, gives out the part A may be compressed down upon the next ring G, and so on as often as there is another ring left, and finally the joint may be made between the face a, and the seat b. To remove a ring as H, it is readily collapsed by pliers, and drawn out of the recess.

Fig. 2, shows the application of the rings to water tube boilers. K, is a water tube, L, L', an end connection into which the tube K is expanded. M, is the manhole plate to give access to the tube K, and which is secured on by the screw and nut m, m'. The rings G, H, are inserted in an annular recess e, in the connection L, which recess e, is formed with under-cut side-wall, d, and inclined base f, the same as hereinbefore described, and said rings G, H, are expanded home to place by compressing the manhole plate M, on said rings by the screw m. Of course, the rings G, H, might be inserted in the manhole plate M, instead of in the end connection L.

In Fig. 5, a ring G, is shown inserted in a recess which has undercut side walls, e, but horizontal base f. It is evident that even with this construction the ring, G, will expand laterally against the under-cut side wall d, when pressure is applied to its top surface g, for the line of said pressure, y, y, falls within the point g', of the beveled under side of the ring G, and therefore, the said pressure will tend to slide said point g', outward and thus the lower part of ring G, will be expanded laterally against, and under the side walls d, d.

In place of having a single bevel, i, the under side of the ring, G, may be formed with a double bevel or claw as $h^2$, $h^3$, Fig. 4. If so formed, then when pressure is applied on the upper surface of the ring G, the claws $h^2$, $h^3$, will spread whether the annular recess has a plane or a somewhat inclined base, and the claw $h^2$, will be pressed against and under the undercut side wall, e, thereby retaining the ring G, in the recess. But the arrangement of the claws $h^2$, $h^3$, is not adapted to joints with more than one.

Having now described my improvement, I claim as my invention—

1. The hereinbefore described member of a compression joint consisting of a malleable ring having one edge adapted to form the joint, and its opposite edge beveled downwardly and outwardly from the center of the ring, and said ring inserted freely in an annular recess in one of the compression members, which recess has its side walls undercut, and its base formed at an angle with the beveled edge of the ring, so that said beveled edge shall deflect the lower part of the ring laterally against said undercut side walls.

2. The hereinbefore described member of a compression joint consisting of several malleable rings, each ring having one edge adapted to form the joint and said edges forming a stepped series, and each ring also having its opposite edge beveled downwardly and outwardly from the center of the ring, said rings being nested one within the other, in an annular recess which has undercut side walls and a base formed at an angle with the beveled edges of the rings, so that the lower part of the outer ring shall be deflected laterally against the undercut side walls of the recess, and the lower part of the other rings shall be deflected laterally under the inclined side of the next outer ring.

3. The hereinbefore described member of a compression joint consisting of a malleable ring having one edge adapted to form the joint and its opposite edge beveled downwardly and outwardly from the center of the ring, and said ring freely inserted in an annular recess in one of the compression members which recess has undercut side walls and a base which inclines downwardly and outwardly from said ring so that the beveled edge of the ring shall deflect the same laterally against, and under the said undercut side walls.

4. A compression joint constructed as follows, one of the compression members having a hard indexical surface, and the other member containing a compressible ring, which ring is freely inserted in an annular recess in said other member, said ring having its under-side beveled downwardly and outwardly from the center of the ring, and being inserted in an annular recess which has undercut side walls, so that pressure on the upper face of the ring shall deflect its beveled face laterally toward the undercut side walls.

In testimony whereof I have hereunto set my hand and affixed my seal, this 2d day of July, 1891, in the presence of two witnesses.

CHARLES S. BAVIER. [L. S.]

Witnesses:
 BERNARD J. ISECKE,
 ALFRED ELY.